UNITED STATES PATENT OFFICE.

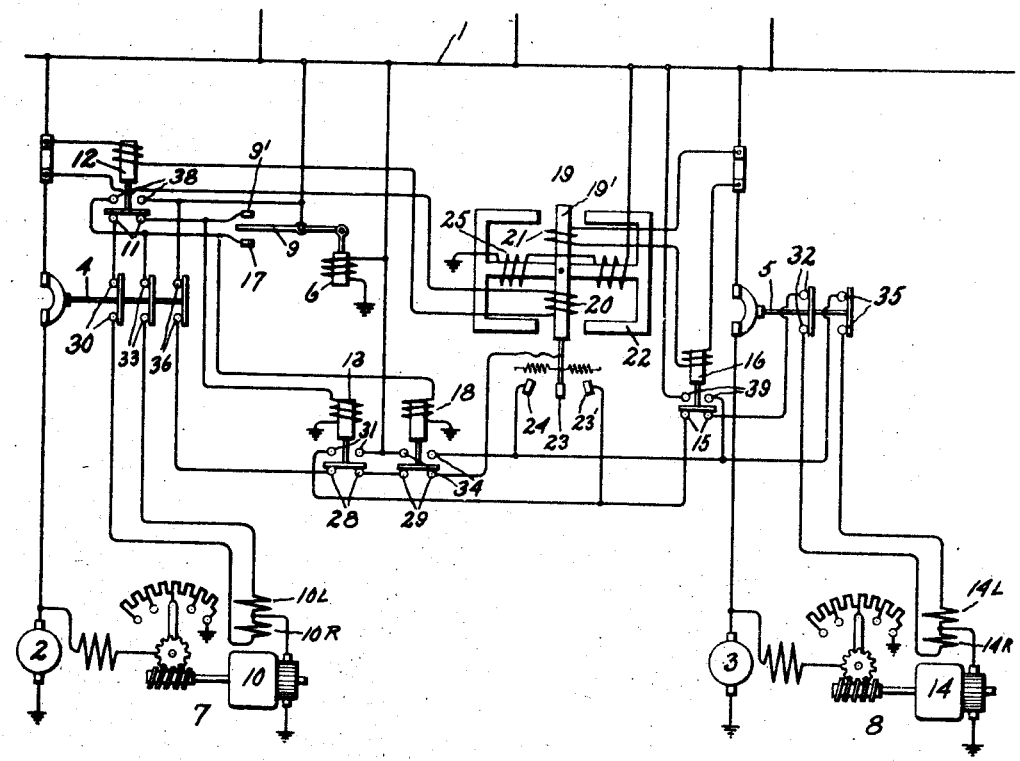

GORDON R. McDONALD, OF SCHENECTADY, NEW YORK, ASSIGNOR TO GENERAL ELECTRIC COMPANY, A CORPORATION OF NEW YORK.

REGULATING SYSTEM.

Application filed February 5, 1926, Serial No. 86 328. Renewed May 26, 1928.

My invention relates to regulating systems and particularly to a regulating system for controlling the relative outputs of a plurality of sources of current supplying a common load and its object is to provide an improved system of this type.

My invention is particularly applicable to a system in which it is desirable to maintain constant the voltage across a common load circuit supplied by a plurality of sources and in which it is also desirable to have each source supply a predetermined proportion of the total load.

In accordance with my invention each source is provided with a suitable regulating device which is controlled normally by a voltage responsive device so as to maintain the voltage of the load circuit at a predetermined value. Means is also provided for controlling certain of the regulating devices when the load circuit voltage is at its normal value so as to maintain the proper division of load between the sources.

My invention will be better understood from the following description, taken in connection with the accompanying drawing, and its scope will be pointed out in the appended claims.

Referring to the accompanying drawing, which shows diagrammatically an electric system embodying my invention, 1 represents an electric circuit which is arranged to be supplied by a plurality of sources of current which may be of any suitable type. As shown in the drawing, the circuit 1 is a direct current circuit and is supplied by two direct current generators 2 and 3. It is obvious, however, that there may be other sources connected to the electric circuit.

In order to simplify the disclosure of my invention, I have shown an electric circuit which has the ground for one side thereof, but it is evident that my invention is not limited to such a circuit.

The generator 2 is arranged to be connected to the electric circuit 1 by means of a circuit breaker 4 and the generator 3 is arranged to be connected to the circuit 1 by means of a circuit breaker 5. These circuit breakers may be of any suitable type, examples of which are well known in the art, and so far as the present invention is concerned, may be either manually or automatically controlled. In order to simplify the disclosure, it is assumed that they are manually controlled, whereas in actual practice they may be a part of an automatic switching equipment for automatically connecting the respective generators to the circuit 1 at the proper time. Examples of such automatic switching equipments are old and well known in the art.

When the generators are connected to the circuit 1 it is desirable to control the voltages thereof so that the voltage at some point on the circuit 1 is maintained at a predetermined value. For accomplishing this result a contact making voltmeter 6 is provided which is connected so that it is energized in accordance with the voltage at the point on the circuit 1 where it is desired to maintain the voltage constant. This voltmeter 6 is arranged to control suitable regulating means associated with each generator so that when the circuit voltage varies from normal, the voltmeter effects a simultaneous change in the excitation of all of the machines that are in operation to restore the circuit voltage to its normal value. As shown in the drawing, the voltmeter 6 controls the motor operated field rheostats 7 and 8 associated respectively with the generators 2 and 3. When the voltage of the electric circuit 1 is below a predetermined value so that the contacts 9 and 9' of the voltmeter are closed, a raising circuit is completed for the motor 10 of the rheostat 7 to effect an increase in the excitation of the generator 2 if the circuit breaker 4 is closed and the output of the generator 2 is below a predetermined value so that the contacts 11 of a current relay 12 in the generator circuit are not open. The closing of the contacts 9 and 9' also completes a circuit for a raising contactor 13, which in turn completes a raising circuit for the motor 14 of the rheostat 8 to effect an increase in the excitation of the generator 3 if the circuit breaker 5 is closed and the output of the generator 3 is below a predetermined value so that the contacts 15 of a current relay 16 in the generator circuit are not open. When the voltage of the electric circuit 1 is above a predetermined value so that the contacts 9 and 17 of the voltmeter 6 are closed, a lowering circuit is completed for the motor 10 to effect a decrease in the excitation of the generator 2 if the circuit breaker 4 is closed. The closing of the contacts 9 and 17 also completes a circuit for a lowering contactor 18, which in turn completes a lowering circuit for the motor 14 to effect a decrease in the excitation of the generator 3 if the circuit breaker 5 is closed.

The current relays 12 and 16 are arranged to complete the lowering circuits of their respective motor operated rheostats whenever the outputs of the respective generators exceed a predetermined value.

When both generators are supplying current in parallel to the electric circuit 1 it is desirable to divide the load proportionately between the generators in accordance with their relative capacities. For accomplishing this result a differential relay 19 of any suitable type, examples of which are well known in the art, is provided for controlling the operation of the motor operated rheostat 8. As shown in the drawing, the relay 19 is a polarized relay comprising an armature 19′ pivotally mounted within two windings 20 and 21 which are wound differentially with respect to each other and are respectively connected in any well known manner so as to be energized in accordance with the current outputs of the generators 2 and 3. The armature 19′ also is pivoted between the polar projections of a stationary magnetic member 22 so that it occupies different positions depending upon the direction of the resultant magnetomotive force produced by the currents through the windings 20 and 21. The member 22 may be a permanent magnet, but preferably is magnetized by means of a magnetizing winding 25 connected to a suitable source such as the circuit 1. The armature is biased to the position shown in the drawing so that it occupies this position when the ampere turns of the two windings 20 and 21 are substantially equal. When the ampere turns of the winding 20 exceed the ampere turns of the winding 21, the direction of the flux in the armature 19 is such that the armature is moved to the right and closes the contacts 23 and 23′ in a raising circuit for the motor 14 to effect an increase in the output of the generator 3. When the ampere turns of the winding 20 are less than the ampere turns of the winding 21, the direction of the flux in the armature 19′ is such that the armature is moved to the left and closes the contacts 23 and 24 in a lowering circuit for the motor 8 to effect a decrease in the output of the generator 3. The windings 20 and 21 are designed so that their ampere turns are equal when the load is divided in the desired manner between the two machines.

In order that the raising and lowering circuits of the motor 14 may not be closed simultaneously, due to one being completed in response to the operation of the voltage relay 6 and the other being completed by the current balanced relay 19, the control circuits of the motor 14 which are controlled by the relay 19 also include the contacts 28 and 29 of the raising and lowering contactors 13 and 18 respectively. These contacts 28 and 29 are closed only when the respective contactors are deenergized. Therefore, normally the rheostat 8 is under the control of the voltmeter 6. When, however, the voltage of the electric circuit 1 is at its normal value, the motor 14 is controlled by the relay 19 to balance the load between the two generators.

The operation of the system shown in the drawing is as follows: When both generators are connected to the circuit 1, the voltage of the circuit is normal, the load is divided between the two machines in the desired manner and the output of each machine is not excessive the voltage and load regulating apparatus is in the position shown in the drawing. It will be observed that the raising and lowering circuits for both motors are open under these conditions.

If the voltage of the circuit 1 decreases so that the voltmeter closes its contacts 9 and 9′, the raising circuit for the motor 10 is completed to effect an increase in the voltage of the generator 2. This raising circuit is from the ungrounded side of the circuit 1, through contacts 9 and 9′ of the voltmeter, contacts 11 of the current relay 12, auxiliary contacts 30 on the circuit breaker 4, field winding $10^R$ and armature winding of the motor 10 to ground. A circuit for the raising contactor 13 is also completed across the circuit 1 through the contacts 9 and 9′ of the voltmeter. The raising contactor 13 in turn completes the raising circuit for the motor 14 to effect an increase in the voltage of the generator 3. This raising circuit is from the ungrounded side of the circuit 1 through contacts 31 of the raising contactor 13, contacts 15 of the current relay 16, auxiliary contacts 32 on the circuit breaker 5, field winding $14^R$ and armature winding of the motor 14 to ground. Both of the motors 10 and 14, therefore, operate simultaneously when the circuit voltage is low to increase the excitations of their respective generators to restore the voltage of the circuit 1 to its normal value.

If the voltage across the circuit 1 is too high, the voltmeter 6 closes its contacts 9 and 17 and completes the lowering circuit for the motor 10 to effect a decrease in the voltage of the generator 2. This lowering circuit is from the ungrounded side of the circuit 1, through the contacts 9 and 17 of the voltmeter 6, auxiliary contacts 33 on the circuit breaker 4, field winding $10^L$ and armature winding of the motor 10 to ground. A circuit for the lowering contactor 18 is also completed across the circuit 1 by the contacts 9 and 17 of the voltmeter 6. The lowering contactor 18 in turn completes the lowering circuit for the motor 14 to effect a decrease in the voltage of the generator 3. This lowering circuit is from the ungrounded side of the circuit 1, through the contacts 34 of the contactor 18, auxiliary contacts 35 on the circuit breaker 5, field winding 14$^L$ and armature winding of the motor 14 to ground. Both of the motors 10 and 14, therefore, operate simultaneously when the circuit voltage is too high to reduce the excitation of their respective generators to restore the circuit voltage to its normal value.

It will be observed that each rheostat is controlled in the same manner by the voltmeter 6 when its associated generator is the only one supplying current to the circuit 1.

When both generators are supplying current to the circuit 1 and each generator is supplying its proper proportion of the total output of the two generators, the relay 19 is in the position shown. If, however, the output of the generator 2 is too great relatively to the output of the generator 3, the relay 19 closes its contacts 23 and 23', and completes the raising circuit for the motor 14, provided the circuit voltage is at its normal value. This raising circuit is from the ungrounded side of the circuit 1, through auxiliary contacts 36 on the circuit breaker 4 which are closed when the circuit breaker is closed, contacts 28 of the raising contactor 13 which are closed when the contactor is deenergized, contacts 29 of the lowering contactor 18 which are closed when the contactor is deenergized, contacts 23 and 23' of the relay 19, contacts 15 of the current relay 16, auxiliary contacts on the circuit breaker 32 which are closed when the circuit breaker is closed, field winding 14$^R$ and armature winding of the motor 14 to ground. The completion of this raising circuit causes the motor 14 to effect an increase in the excitation of the generator 3 so as to increase its output and decrease the output of the generator 2.

If the output of the generator 2 is too small relatively to the output of the generator 3, the relay 19 closes its contacts 23 and 24, and completes a lowering circuit for the motor 14, provided the circuit voltage is at its normal value. This lowering circuit is from the ungrounded side of the circuit, through auxiliary contacts 36 on the circuit breaker 4, contacts 28 of the raising contactor 13, contacts 29 of the lowering contactor 18, contacts 23 and 24 of the relay 19, auxiliary contacts 35 on the circuit breaker 5, field winding 14$^L$ and armature winding of the motor 14 to ground. The completion of this lowering circuit causes the motor to operate the rheostat 8 so that the output of the generator 3 is decreased and the output of the generator 2 is increased.

It will be observed that the above traced raising and lowering circuits include contacts controlled by the circuit breakers 4 and 5 and the raising and lowering contactors 13 and 18 so that the relay 19 is operative to control the rheostat 8 only when both generators are connected to the circuit 1 and the voltage of the circuit is at its normal value.

One advantage of this arrangement is that if the load is properly divided between the generators when a change in the circuit voltage occurs, the contact making voltmeter effects a similar change in the excitation of both machines so that when the voltage of the circuit has been restored to its normal value both generators are still carrying substantially the same proportion of the total load as they were carrying before the voltage change occurred. Therefore, the amount of adjustment required to balance the load between the generators after a voltage change has occurred is materially reduced over some of the arrangements used heretofore.

If at any time the current output of the generator 2 exceeds a predetermined value, the current relay 12 opens its contacts 11 so that the raising circuit for the motor 11 cannot be completed, and closes its contacts 38 to complete the lowering circuit for the motor 10 so that the excitation of the generator 2 is decreased until the current relay 12 opens its contacts 38. This current relay 12 operates to maintain the current output constant so long as there is an excessive load connected to the circuit 1. The current relay 16 is arranged to operate in a similar manner to control the output of the generator 3 when there is an excessive load connected to the circuit 1. When the contacts 39 of the relay 16 are closed, the lowering circuit for the motor 14 is completed to decrease the excitation of the generator 3.

While I have described the arrangement shown in the drawing as regulating the outputs of the machines 1 and 2 so as to maintain a predetermined division between the outputs thereof, this arrangement is also arranged to regulate the relative currents supplied to the machines 2 and 3 in case they receive current from the line as they may do in systems where regenerative breaking is employed.

For example, assume that the machines 2 and 3 in the drawing are receiving current from the circuit 1 while the voltage thereof is normal and the current supplied to the machine 2 is greater than the current supplied to the machine 3. Under these conditions the ampere turns of the winding 20 of the polarized relay 19 exceed the ampere turns of the winding 21. Since, however, the currents in these two windings are in the opposite directions from what they are when the machines are supplying current to the circuit 1, the resultant flux produced in the armature 19' is also in the opposite direction and, therefore, the polarized relay 19 operates to close its contacts 23 and 24 instead of its contacts 23 and 23'. The closing of the contacts 23 and 24 effects in the manner above described a decrease in the excitation of the machine 3 so that the current supplied to the machine 3 is increased until it is equal to the current supplied to the machine 2.

Similarly when the machine 3 receives more current than the machine 2 from the circuit 1, the armature 19' is magnetized in such a direction that the polarized relay 19 closes its contacts 23 and 23' and effects an increase in the excitation of the machine 3 so as to equalize the currents supplied to both machines.

Therefore, it will be observed that the polarized relay 19 is arranged to maintain the proper division of current between the machines 2 and 3 whether the machines are supplying current to or receiving current from the circuit 1.

While I have, in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States is:—

1. In a regulating system, an electric circuit, a plurality of dynamo electric machines connected in parallel and supplying current to said circuit, voltage responsive means, regulating means associated with each machine and arranged to be controlled normally by said voltage responsive means, and means responsive to the relative outputs of said machines arranged to control one of said regulating means when said one of said regulating means is not being controlled by said voltage responsive means.

2. In a regulating system, an electric circuit, two dynamo electric machines connected in parallel and supplying current to said circuit, means responsive to the voltage of said electric circuit, excitation controlling means associated with each machine arranged to be controlled normally by said voltage responsive means, and means responsive to the difference between the current outputs of the two machines arranged to control one of said excitation controlling means when said one of said excitation controlling means is not being controlled by said voltage responsive means.

3. In a regulating system an electric circuit, two dynamo electric machines connected in parallel and supplying current to said circuit, a relay responsive to the voltage of said electric circuit, a relay responsive to the difference between the current outputs of the two machines, an adjustable rheostat in the field circuit of one of said machines controlled by said voltage relay, and an adjustable rheostat in the field circuit of the other machine arranged to be controlled normally by said voltage relay and by said current difference responsive relay when it is not being controlled by said voltage responsive means.

4. In a regulating system, an electric circuit, two dynamo electric machines connected in parallel and supplying current to said circuit, a motor operated rheostat in the field circuit of each generator, a raising circuit and a lowering circuit for the motor of each motor operated rheostat, a relay responsive to the voltage of said circuit for effecting the completion of both of said raising circuits when the circuit voltage is above a predetermined value and the completion of both of said lowering circuits when the circuit voltage is below said predetermined value, and a differential relay responsive to the relative outputs of the two generators for controlling the raising and lowering circuits of one of said motors when the circuit voltage is at a predetermined voltage.

5. In combination a load circuit, a plurality of sources for supplying current thereto, means responsive to the voltage of said load circuit for simultaneously controlling said sources to regulate the output thereof, and means responsive to the difference between the outputs of said sources to control the division of load between said sources.

6. In a regulating system, an electric circuit, two sources of current connected in parallel and supplying current to said circuit, regulating means for one of said sources, means responsive to the voltage of said electric circuit for controlling the operation of said regulating means to maintain the voltage of said electric circuit at a predetermined value while said one of said sources is supplying current to said circuit, and means responsive to the relative current outputs of said sources and operative to control said regulating means only when the voltage of said electric circuit is at said predetermined value.

7. In a regulating system, an electric circuit, two dynamo electric machines connected in parallel and supplying current to said circuit, an adjustable field rheostat for one of said machines, a motor for controlling the adjustment of said rheostat, two control circuits for said motor, each being arranged when completed to effect the operation of said motor to produce a decrease in the excitation of said one of said machines, means responsive to the voltage of said electric circuit for effecting the completion of one of said control circuits when the circuit voltage is above a predetermined value, means responsive to the relative current outputs of said machines, and contacts in the other of said control circuits controlled by said voltage responsive means and said current output responsive means whereby said other of said control circuits is completed only when the electric circuit voltage is at said predetermined value and the current output of said one of said machines is too great relatively to the current output of the other machine.

8. In a regulating system, an electric circuit, two dynamo electric machines connected in parallel and supplying current to said circuit, means responsive to the relative outputs of the two machines for controlling the excitation of one of said machines, and means responsive to the voltage of said circuit for rendering said first mentioned means inoperative to increase the excitation of said one of said machines when the voltage of said electric circuit is above a predetermined value.

9. In a regulating system, an electric circuit, two dynamo electric machines connected in parallel and supplying current to said circuit, means responsive to the relative outputs of the two machines for controlling the excitation of one of said machines, and means responsive to the voltage of said circuit for rendering said first mentioned means inoperative to decrease the excitation of said one of said machines when the voltage of said electric circuit is above a predetermined value.

10. In a regulating system, an electric circuit, two generators connected in parallel and supplying current to said circuit, a motor operated rheostat in the field circuit of one of said generators, a raising circuit and a lowering circuit associated with said motor operated rheostat, a differential relay responsive to the relative current outputs of said generator, a relay responsive to the voltage of said electric circuit, and contacts in said raising and lowering circuits controlled by said relays whereby said raising circuit is completed when the voltage of said electric circuit is below a predetermined value and also when said one of said generators is supplying less than a predetermined proportion of the total current supplied by both generators and the voltage of said electric circuit is not above a predetermined value and said lowering circuit is completed when the voltage of said electric circuit is above a predetermined value and also when said one of said generators is supplying more than a predetermined proportion of the total current supplied by both generators and the voltage of said electric circuit is not below a predetermined value.

11. In a regulating system, an electric circuit, two dynamo electric machines connected in parallel and supplying current to said circuit, a relay responsive to the voltage of said electric circuit, a relay responsive to the difference between the outputs of the two machines, regulating means associated with one of said machines controlled by said voltage relay, regulating means associated with the other machine and controlled by said voltage relay when the voltage of said electric circuit varies from a predetermined value and controlled by said other relay when the voltage of said electric circuit is at said predetermined value, and means responsive to the output of said other machine for controlling the regulating means associated therewith.

12. In a regulating system, an electric circuit, two dynamo electric machines connected in parallel and supplying current to said circuit, a relay responsive to the voltage of said electric circuit, a differential relay responsive to the difference between the outputs of the two machines, regulating means associated with one of said machines controlled by said voltage relay, regulating means associated with the other machine and controlled by said voltage relay when the voltage of said electric circuit varies and controlled by said differential relay when the voltage of said electric circuit is a predetermined value, and means responsive to the output of said other machine for removing its regulating means from the control of said relays.

13. In a regulating system, an electric circuit, two dynamo electric machines, switching means for connecting each machine to said circuit, a relay responsive to the voltage of said electric circuit, a current balance relay responsive to the difference between the current outputs of said machine, regulating means for one of said machines normally controlled by said voltage relay, a control circuit for said regulating means controlled by said current balance relay and contacts in said control circuit controlled by said relays and said switching means whereby said regulating means is controlled through said circuit by said current balance relay only when both of said machines are connected to said electric circuit and the voltage of said circuit is at a predetermined value.

14. In combination, a load circuit, a plurality of dynamo electric machines connected thereto, means responsive to the voltage of said load circuit for simultaneously controlling said machines to regulate the voltage of said load circuit, and means responsive to the direction and relative magnitudes of the currents through said machines for controlling the relative currents flowing through said machines.

15. In a regulating system, an electric circuit, two dynamo electric machines connected in parallel across said circuit, means responsive to the voltage of said circuits, excitation controlling means associated with each machine and controlled normally by said voltage responsive means, and means responsive to the direction and relative magnitudes of the currents flowing through said machines arranged only when said excitation controlling means are not being controlled by said voltage responsive means to control one of said excitation controlling means to maintain a predetermined relation between the currents flowing through said machines.

16. In a regulating system, an electric circuit, dynamo electric machines connected in parallel across said circuit, a polarized relay responsive to the direction and relative magnitudes of the currents flowing through said machines for regulating the current through one of the machines, and means responsive to the voltage of said circuit for rendering said polarized relay inoperative to control the current through said one of said machines when the voltage of said circuit is a predetermined value.

In witness whereof, I have hereunto set my hand this 4th day of February, 1926.

GORDON R. McDONALD.